United States Patent Office 3,274,134
Patented Sept. 20, 1966

3,274,134
VERY SOFT URETHANE VULCANIZATES WHICH COMPRISE A FULLY SATURATED URETHANE PREPOLYMER AND AN ORGANOTIN COMPOUND
Thomas Ramos, 536 Fort Washington Ave., New York, N.Y.
No Drawing. Filed Sept. 14, 1961, Ser. No. 138,202
3 Claims. (Cl. 260—18)

The invention described herein may be manufactured and used by or for the Government of the United States of America for governmental purposes without the payment of any royalties thereon or therefor.

This invention relates to self-curing polyurethane vulcanizates and their production. Polyurethanes have many practical uses, but difficulty has been experienced in obtaining satisfactory, very soft polyurethane vulcanizates and their production has been involved.

An object of this invention is to provide very soft polyurethane vulcanizates which cure at room tempeartures within a reasonably short time, and which require no preheating of the liquid urethane polymer or of the curing agent prior to their mixing, and no post curing of the mixture at elevated temperatures.

Another object is to provide a liquid mixture which may be cured at room temperatures to provide a very soft, polyurethane vulcanizate, which may be used for the manufacture of paint, various coatings, potting materials, and sound damping plates, coatings, and bodies, which is batch stable after mixing for periods long enough to enable application to a surface to be coated or for molding into a body of a desired shape and size, which when cured may be cellular or non-cellular as desired, and resistant to flames.

A further object is to provide a very soft, polyurethane vulcanizate and a relatively simple and inexpensive method of making the same, and which vulcanizates are self curing at room temperatures, and require no preheating of the components before mixing.

A further object is to provide a liquid mixture for use in making polyurethane vulcanizates, which is unreactive towards moisture, whose rate of curing may be selectively varied, which may be used to make very soft vulcanizates, which may be used as a paint by the addition of pigments, and which may be cured in desired forms and sizes.

Other objects and advantages will appear from the following description of several examples of the invention, and the novel features will be particularly pointed out in connection with the appended claims.

The use of a polyol, such as castor oil, alone as a curing agent for polyurethane in making vulcanizates therefrom does not provide for a satisfactory cure of the urethane polymers at room tempeartures, due, to some extent, to the uncertain effect of moisture in the ambient air upon the isocyanates in the liquid urethane, even with a chlorinated paraffin inhibited isocyanate. I have discovered that by adding an organotin compound, such as dibutyltin dilaurate, dibutyltin, di-2 ethyl hexoate, stannous 2-ethyl hexoate and stannous octoate, any one of these alone, together, or in combination with castor oil or other polyol curing agent, to a urethane polymer formed from isocyanates, the reaction and speed up of the formation of polyurethane is possible without the use of heat. In addition, the use of dibutyltin dilaurate as a curing agent in combination or together with a polyol, such as castor oil, as the curing agents, does not tend to promote premature gelatin, such as occurs when amines are used as curing agents for the urethane polymers. The organotin compound (dibutyltin dilaurate) is not used in combination with certain amines such as triethylene diamine and N-ethyl morpholine in order to promote cross-linking or curing of the urethane polymer.

The use of polyols, diols, and mixtures of polyols and diols, alone, as curing agents for urethane polymers, has not given satisfactory results, unless heat is used to post cure them. In accordance with this invention, to liquid urethane polymers are added a chlorinated paraffin, a polyol, and an organotin compound, which are mixed together. To this basic mixture, which is self curing at room temperatures within a reasonable time, one may, when desired, add fillers, pigments, or other agents that adapt the product to specific end uses. If the product is to be used as a sound or vibration damping material, to be confined against a surface whose vibrations are to be damped, a suitable finely divided filler may be added. Such a filler may be antimony trioxide which is a flame retardant and viscosity modifier, or if the product is to be used as a paint or thin coating material, the mixture before it cures, and with or without the antimony trioxide, is diluted with a liquid carrier vehicle when necessary to give the product the desired viscosity, and also any coloring pigment. Such a diluted liquid is applied to a surface to be covered promptly and before it cures in any suitable manner, such as, for example, by spraying or brushing it upon such surface. If the product is to be used as a formed body, it is placed, before it cures, in a suitable mold. The mixture cures at room temperature while it is quiescent.

Some examples of basic mixtures are given below for molding to form plates used to damp vibrations of a wall to which the cured mixture in the form of plates may be confined.

EXAMPLE I

| Parts by Weight | Component | Function |
| --- | --- | --- |
| 100 | Adiprene L-100 | Urethane Polymer. |
| 20 | Halowax 4004 | Chlorinated paraffin. |
| 80 | Antimony trioxide | Flame retardant and viscosity modifier. |
| 40 | Castor oil | Curing agent. |
| 20 | Dibutyltin Dilaurate | Do. |

The Adiprene L-100 is a urethane polymer product bearing this trademark Adiprene which is marketed by its maker, E. I. du pont de Nemours & Co. (Inc.) of Wilmington, Delaware, and described, for example, in "Development Products Report, No. 10," dated March 15, 1958, and in Report No. 13, dated October 1958, both published in printed form and distributed by said Du Pont de Nemours Company. This Adiprene L-100 is a fully saturated urethane prepolymer which is the reaction product of poly(1,4-oxybutylene) glycol and tolylene diisocyanate of approximately 2,000 molecular weight and containing about 4.0 to 4.3 percent by weight of isocyanate groups as described at page 299 of the publication "Polyurethanes: Chemistry and Technology, II, Technology" authored by H. Saunders and K. C. Frisch and published by Interscience Publishers, a division of John Wiley & Sons, New York, New York.

EXAMPLE II

| Parts by Weight | Component | Function |
| --- | --- | --- |
| 100 | Adiprene L-100 | Urethane polymer. |
| 10 | Halowax 4004 | Chlorinated paraffin. |
| 40 | Antimony trioxide | Flame retardant and viscosity modifier. |
| 40 | Castor oil | Curing agent. |
| 16 | Dibutyltin Dilaurate | Do. |

EXAMPLE III

| Parts by Weight | Component | Function |
|---|---|---|
| 100 | Adiprene L-100 | Urethane polymer. |
| 10 | Halowax 4004 | Chlorinated paraffin. |
| 40 | Antimony trioxide | Flame retardant and viscosity modifier. |
| 50 | Castor oil | Curing agent. |
| 20 | Dibutyltin Dilaurate | Do. |

EXAMPLE IV

| Parts by Weight | Component | Function |
|---|---|---|
| 100 | Adiprene L-100 | Urethane polymer. |
| 25 | Halowax 4004 | Chlorinated paraffin. |
| 32 | Antimony trioxide | Flame retardant and viscosity modifier. |
| 50 | Castor oil | Curing agent. |
| 12 | Dibutyltin Dilaurate | Do. |

EXAMPLE V

| Parts by Weight | Component | Function |
|---|---|---|
| 100 | Adiprene L-100 | Urethane polymer. |
| 25 | Halowax 4004 | Chlorinated paraffin. |
| 32 | Antimony trioxide | Flame retardant and viscosity modifier. |
| 50 | Castor oil | Curing agent. |
| 4 | Dibutyltin Dilaurate | Do. |

EXAMPLE VI

| Parts by Weight | Component | Function |
|---|---|---|
| 100 | Adiprene L-100 | Urethane polymer. |
| 10 | Halowax 4004 | Chlorinated paraffin. |
| 20 | Antimony trioxide | Flame retardant and viscosity modifier. |
| 50 | Castor oil | Curing agent. |
| 4 | Dibutyltin Dilaurate | Do. |

EXAMPLE VII

| Parts by Weight | Component | Function |
|---|---|---|
| 100 | Adiprene L-100 | Urethane polymer. |
| 5 | Halowax 4004 | Chlorinated paraffin. |
| 15 | Antimony trioxide | Flame retardant and viscosity modifier. |
| 50 | Castor oil | Curing agent. |
| 10 | Dibutyltin Dilaurate | Do. |

EXAMPLE VIII

| Parts by Weight | Component | Function |
|---|---|---|
| 100 | Adiprene L-100 | Urethane polymer. |
| 10 | Halowax 4004 | Chlorinated paraffin. |
| 35 | Antimony trioxide | Flame retardant and viscosity modifier. |
| 35 | Castor oil | Curing agent. |
| 15 | Dibutyltin Dilaurate | Do. |

EXAMPLE IX

| Parts by Weight | Component |
|---|---|
| 100 | Urethane polymer. |
| 5 to 55 | Chlorinated hydrocarbon (chlorinated paraffin). |
| 1 to 80 | Antimony trioxide. |
| 20 to 55 | Polyol (castor oil). |
| 1 to 30 | Organotin (Dibutyltin Dilaurate). |

The chlorinated paraffin when mixed with the urethane polymer, acts as a hydrophobic agent for the isocyanate of the polymer and inhibits the isocyanate by increasing its resistance to moisture vapor transmission, also by acting as a flame retardant, as a diluent for the urethane polymer, as a plasticizer, and to inhibit the formation of a tight, three dimensional network. The chlorinated paraffin, when mixed with a urethane polymer, forms a mixture that is unreactive towards moisture or water and which can, for convenience, be identified as inhibited isocyanate. Very soft urethane polymer vulcanizates can be obtained or prepared by mixing at room temperature, the chlorinated paraffin inhibited isocyanate with a combination of a polyol (such as castor oil) organotin compound as the curing agents.

The castor oil or other polyol, when used alone as a curing agent for urethane polymers, is inadequate to cause curing at room temperatures within a reasonable time such as within 10 hours. However, when its is used in conjunction with an organotin compound such as dibutyltin dilaurate, it acts as a satisfactory curing agent and plasticizer. Such organotin compounds act to promote and/or accelerate the rate of curing. By increasing the concentration of the organotin compound, the rate of reaction and speed of curing of the polyurethane was increased, and hence the time desired for the curing can be varied or controlled by selection of the amount of the organotin compound which is added to the mixture. It is postulated that the organotin compound such as the dibutyltin dilaurate, acts like a weak base and/or like the action of a catalytic type, tertiary amine.

The chlorinated paraffin which has been found particularly useful and which was used in the above-described examples, had a chlorine content of about 40%. The filler antimony trioxide used in such examples, is optional, and is added as a flame retardant-viscosity modifier and filler, particularly in preparing plates for confinement against walls whose vibrations it is desired to damp.

It is believed that all polyols and diols may be used with the organotin compounds as effective curing agents, but castor oil is a plentiful, inexpensive, practical and satisfactory polyol to employ in the use of this invention. A few specific examples of other polyols, besides castor oil which are particularly useful in the practice of this invention, are butanediol, trimethylolpropane and hexanetriol. The polyols of high molecular weight, such that of castor oil or higher appear to give superior results in that they yield softer compounds than are obtained with polyols of lower molecular weight than that of castor oil.

A few specific examples of organotin compounds which are useful in the practice of this invention, are:

dibutyltin dilaurate
dibutyltin di-2-ethyl hexoate
stannous 2-ethyl hexoate
stannous octoate In the practice of the invention as illustrated in said examples, the chlorinated paraffin-urethane mixture, referred to as inhibited isocyanates, was first prepared by mixing from about 5 to 55% by weight of the chlorinated paraffin with the urethane prepolymer. The mixing was with conventional mixers or stirrers for about 15 minutes, with both chlorinated paraffin and the urethane polymer at room temperature. This mixture is stable against moisture that may get into it from any source, such as from ambient air. This mixture or inhibited isocyanate is now ready for the addition of the flame retardant-viscosity modifier and curing agents. The filler, such as antimony trioxide, in the desired amount up to about 80% by weight, is added to the mixture of urethane polymer and chlorinated paraffin, and mixed therewith at room temperature by the same manner as the first mixing of the urethane polymer and the chlorinated paraffin. Then to this mixture of urethane polymer, chlorinated paraffin and filler one may add from about 20 to 55% by weight of a polyol such as castor oil, and from about 1 to 30% by weight of an organotin compound such as dibutyltin dilaurate, and further mix them as in the preceding mixings.

When the product is to be used as a paint, it is well to dilute the uncured mixture with a liquid which vaporizes at room temperatures, so that the uncured paint may be applied to a surface to be covered by a brush, a roller or by spraying, as one would apply any paint, and then the evaporation of the diluent would leave on the covered surface a film or layer of the mixture which would cure or harden by standing under the action of the curing agents in the applied mixture. Any fillers, such as antimony trioxide may be included in the paint or omitted, depending upon the nature of the coating to be applied as a paint. When a heavier coating is desired on a surface, the uncured mixture, with or without filler is applied in a viscosity, which makes it possible to make the coating of the desired thickness. The mixture with a desired amount of filler is also useful as a potting material.

Heretofore in the making of polyurethane vulcanizates, it was necessary to preheat separately the urethane polymer and the curing agents, then mix them, and then heat or bake the mixture in a mold, but the present invention is much simpler in that there is no preheating of the components separately before mixing, or post heating of the mixture to cause curing. The curing proceeds at room temperatures, and the time of curing is easily controlled by the amount of the organotin compound which is added. The product obtained is considerably softer than was possible with prior practice.

An inorganic filler in small particles, such as sand and lead shot, may be incorporated in and distributed through the material before it cures, to absorb and damp vibratory energy in a wall to which the cured mixture may be attached.

In the conventional procedure for making polyurethane vulcanizates, the hardness of the product usually varies, as indicated on a Shore type durometer, from about 100 to about 20, whereas the vulcanizate made according to this invention can be made considerably softer, such as a hardness indicated on the Shore type durometer of much less than 20. The product may also be made cellular when desired by blowing it after mixing and before it cures by conventional procedures for that purpose.

Because of variaitons in the properties of the various chemical components, compounds or materials, as obtained commercially and used in connection with this invention, all of the values, examples, proportions, ratios and physical properties given hereinabove in order to explain the nature and principle of the invention, are to be considered as typical and illustrative and not necessarily optimum.

It will be understood that various changes in the details, steps, materials, proportions of materials, and procedure, which have been herein described in order to explain the nature of the invention, may be made by those skilled in the art within the principle and scope of the invention as expressed in the appended claims.

I claim:
1. A soft polyurethane vulcanizate, which comprises a mixture, in the proportions in parts by weight, of
    (a) 100 parts of a preformed fully saturated urethane polymer which is the reaction product of poly (1,4-oxybutylene) glycol and tolylene diisocyanate of approximately 2000 molecular weight and containing about 4.0 to 4.3 percent by weight of isocyanate groups,
    (b) from about 5 to 55 parts of a chlorinated paraffin,
    (c) about 20 to 55 parts of a polyol having a molecular weight at least about as high as that of castor oil, and
    (d) about 10 to 30 parts of an organotin compound selected from the group consisting dibutyltin dilaurate, dibutyltin di-2 ethyl hexoate, stannous 2-ethyl hexoate and stannous octoate.

2. The vulcanizate according to claim 1, wherein the polyol is castor oil.

3. A damping and coating material for damping vibrations of a body to which it may be confined, which comprises a mixture of:
    (a) 100 parts by weight of a preformed fully saturated urethane prepolymer which is the reaction product of poly (1,4-oxybutylene) glycol and tolylene diisocyanate of approximately 2000 molecular weight and containing about 4.0 to 4.3 percent by weight of isocyanate groups,
    (b) 5 to 55 parts by weight of a chlorinated paraffin,
    (c) 20 to 25 parts by weight of a polyol curing agent having a molecular weight of about that of castor oil or higher,
    (d) 10 to 30 parts by weight of an organotin compound selected from the group consisting of dibutyltin dilaurate, dibutyltin di-2 ethyl hexoate, stannous 2-ethyl hexoate, and stannous octoate, and
    (e) a filler.

References Cited by the Examiner
UNITED STATES PATENTS

| | | | |
|---|---|---|---|
| 2,378,715 | 6/1945 | Leatherman | 106—15 |
| 2,628,946 | 2/1953 | Juda et al. | 260 |
| 2,981,719 | 4/1961 | Muhlhausen et al. | 260—75 |
| 2,983,693 | 5/1961 | Sievers | 260—18 |
| 3,036,999 | 5/1962 | Worsley et al. | 260—75 |
| 3,039,976 | 6/1962 | Barnes et al. | 260—2.5 |
| 3,084,177 | 4/1963 | Hostettler et al. | 260—75 |
| 3,196,026 | 7/1965 | Menard et al. | 260—75 |

LEON J. BERCOVITZ, *Primary Examiner.*

MILTON STERMAN, JAMES A. SEIDLECK,
*Examiners.*

J. W. BEHRINGER, R. W. GRIFFIN,
*Assistant Examiners.*